(12) United States Patent
Nicks et al.

(10) Patent No.: US 11,731,493 B2
(45) Date of Patent: Aug. 22, 2023

(54) MONITORING SYSTEMS AND METHODS FOR VEHICLES

(71) Applicant: THE BOEING COMPANY, Chicago, IL (US)

(72) Inventors: Eric Lee Nicks, Defiance, MO (US); James Ralph Hamilton, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 897 days.

(21) Appl. No.: 16/458,309

(22) Filed: Jul. 1, 2019

(65) Prior Publication Data

US 2021/0002940 A1 Jan. 7, 2021

(51) Int. Cl.
B60J 5/00 (2006.01)
B64C 1/14 (2006.01)
B64F 5/60 (2017.01)

(52) U.S. Cl.
CPC ............... B60J 5/00 (2013.01); B64C 1/1407 (2013.01); B64F 5/60 (2017.01)

(58) Field of Classification Search
CPC ................................. B64C 1/1407; B64F 5/60
See application file for complete search history.

(56) References Cited

U.S. PATENT DOCUMENTS

| 2009/0261973 | A1* | 10/2009 | Eakle, Jr. | G07C 9/00309 340/540 |
| 2012/0010835 | A1* | 1/2012 | Sonsterod | G08B 13/1681 702/70 |
| 2015/0268090 | A1* | 9/2015 | Munger | G01H 1/00 73/583 |
| 2018/0162272 | A1* | 6/2018 | Newton | G10K 11/178 |
| 2019/0299928 | A1* | 10/2019 | Chan | B60R 25/1018 |
| 2020/0148233 | A1* | 5/2020 | Chien | B61B 1/02 |
| 2020/0266906 | A1* | 8/2020 | Lee | G01R 29/0871 |
| 2020/0406727 | A1* | 12/2020 | DiCarlo | E05F 15/40 |

* cited by examiner

Primary Examiner — James J Lee
Assistant Examiner — Wenyuan Yang
(74) Attorney, Agent, or Firm — The Small Patent Law Group LLC; Joseph M. Butscher

(57) ABSTRACT

A monitoring system and method are configured to detect a status of a door for a component on a vehicle. The monitoring system includes a sound sensor positioned within an auditory range of the door. The sound sensor detects sound energy generated in relation to a closed position of the door and an open position of the door. The sound sensor outputs a sound signal indicative of the sound energy. A monitoring control unit is in communication with the sound sensor. The monitoring control unit receives the sound signal and analyzes the sound signal to determine the status of the door.

20 Claims, 4 Drawing Sheets

MONITORING SYSTEMS AND METHODS FOR VEHICLES

FIELD OF EMBODIMENTS OF THE DISCLOSURE

Embodiments of the present disclosure generally relate to monitoring systems and methods for vehicles, and more particularly, to systems and methods that monitor the status of doors for components on vehicles.

BACKGROUND OF THE DISCLOSURE

Aircraft transport passengers and cargo between destinations. As an aircraft lands at an airport and arrives at a gate, passengers aboard the aircraft disembark, and a different set of passengers may then board the aircraft for a flight to a different destination. In addition to passengers leaving and boarding the aircraft, baggage, cargo, and the like are also removed from and loaded into designated spaces within the aircraft. Further, the aircraft is refueled between flights.

As the aircraft is prepared for a flight, ground crew remove items from cargo areas, refuel the aircraft, and perform other duties to ready the aircraft for the next flight. Before the aircraft is able to push back from a gate, the ground crew perform various tasks, such as inspecting the aircraft to ensure that the cargo doors are closed, refueling lines have been removed, fuel tank doors are closed, and other such manual tasks.

As can be appreciated, the process of manually inspecting the various doors of an aircraft is time and labor intensive, and typically increases a turnaround time (that is, a time between arrival and subsequent departure) of the aircraft.

SUMMARY OF THE DISCLOSURE

A need exists for a system and a method that reduce turnaround time of an aircraft at a gate of an airport. Further, a need exists for a system and a method that quickly and efficiently monitor status of doors of various components of an aircraft, such as cargo doors, fuel doors, and the like.

With those needs in mind, certain embodiments of the present disclosure provide a monitoring system that is configured to detect a status of a door for a component on a vehicle. The monitoring system includes a sound sensor positioned within an auditory range of the door. The sound sensor detects sound energy generated in relation to an open position of the door and a closed position of the door. The sound sensor outputs a sound signal indicative of the sound energy. A monitoring control unit is in communication with the sound sensor. The monitoring control unit receives the sound signal and analyzes the sound signal to determine the status of the door.

In at least one embodiment, the sound sensor is within an internal chamber of the component. In at least one other embodiment, the sound sensor is mounted on the component.

In at least one embodiment, the sound sensor is a microphone. In at least one other embodiment, the sound sensor is an accelerometer.

In at least one embodiment, the sound sensor detects the sound energy generated by the door as the door moves between a closed position and an open position. As a further example, the monitoring control unit recognizes the sound energy caused by one or more latches, one or more hinges, or other portions of the door as the door moves between the closed position and the open position. The monitoring system may also include a sound filter that filters sound that is unrelated to the sound energy generated by the door from the sound signal.

In at least one embodiment, the monitoring control unit compares the sound signal in relation to a sound threshold to determine when the door is the open position or the closed position.

As an example, the component includes a cargo bay. As another example, the component includes a fuel tank.

Certain embodiments of the present disclosure provide a monitoring method that is configured to detect a status of a door for a component on a vehicle. The monitoring method includes positioning a sound sensor positioned within an auditory range of the door, detecting (by the sound sensor) sound energy generated in relation to an open position of the door and a closed position of the door, outputting (by the sound sensor) a sound signal indicative of the sound energy, receiving (by a monitoring control unit in communication with the sound sensor) the sound signal, and analyzing (by the monitoring control unit) the sound signal to determine the status of the door.

In at least one embodiment, said analyzing includes recognizing the sound energy caused by one or more latches, one or more hinges, or other portions of the door as the door moves between the closed position and the open position. The monitoring method may also include filtering (by a sound filter) sound that is unrelated to the sound energy generated by the door from the sound signal.

In at least one embodiment, said analyzing includes comparing the sound signal in relation to a sound threshold to determine when the door is the open position or the closed position.

Certain embodiments of the present disclosure provide a vehicle including a component having a door that is configured to move between a closed position and an open position, and a monitoring system that is configured to detect a status of the door, as described herein.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a monitoring system for a vehicle. The monitoring system includes a sound sensor proximate to a door for a component on the vehicle. For example, the sound sensor is positioned within an internal chamber of the component within a range of the door in which the sound sensor is able to detect sound signals generated by the door opening, such as from sounds generated by latches engaging or disengaging portions of the door, a hinge of the door moving between closed and open positions, and the like. The sound sensor is in communication with a monitoring control unit, such as through one or more wired or wireless signals. The monitoring control unit receives sound signals indicative of the sounds generated by door motion and position. The monitoring control unit analyzes the sound signals to determine a status of the door. In particular, the monitoring control unit determines whether the door is open or closed. The monitoring control unit then outputs a door status signal, such as through a wired or wireless connection, to one or more individuals (for example, an operator, ground crew, or the like).

In at least one embodiment, the sound sensor is a microphone that detects generated sound. In at least one other embodiment, the sound sensor is an accelerometer that detects vibrations caused by generated sound.

Figure 1:
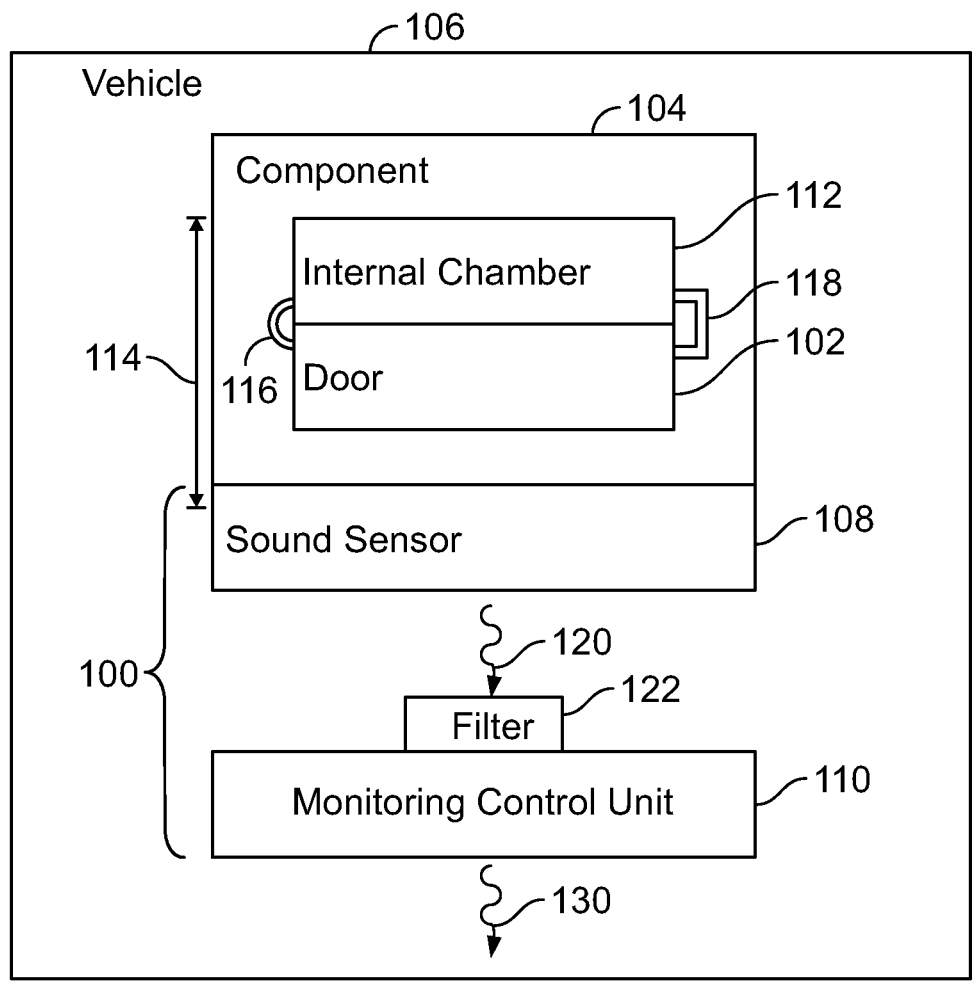
FIG. 1 illustrates a schematic block diagram of a monitoring system for a door of a component of a vehicle, according to an embodiment of the present disclosure.

FIG. 1 illustrates a schematic block diagram of a monitoring system 100 for a door 102 of a component 104 of a vehicle 106, according to an embodiment of the present disclosure. In at least one embodiment, the vehicle 106 is a commercial aircraft, and the component 104 is a cargo bay or fuel tank.

The monitoring system 100 includes a sound sensor 108 in communication with a monitoring control unit 110, such as through one or more wired or wireless connections. The sound sensor 108 is proximate to the door 102. For example, the sound sensor 108 is within an internal chamber 112 of the component 104. As another example, the sound sensor 108 is mounted to the component 104 outside of the internal chamber 112. In at least one other embodiment, the sound sensor 108 is separated from the component 104, and within an auditory range 114 in which the sound sensor 108 is able to detect sound energy generated by one or more hinges 116, one or more latches 118, or other portions of the door 102 that emit sound energy as the door 102 is moved between a closed position and an open position.

In at least one embodiment, the monitoring control unit 110 is within the vehicle 106, such as within a cockpit of the vehicle 106. Optionally, the monitoring control unit 110 may be remotely located from the vehicle, such as within a central monitoring station. In at least one embodiment, the monitoring control unit 110 may be within a handheld device, such as within a smart phone, tablet, portable computer.

Figure 2:
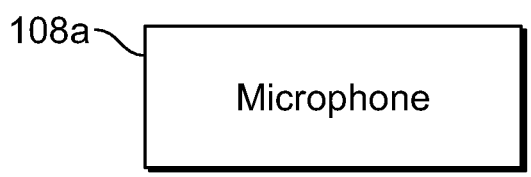
FIG. 2 illustrates a block diagram of a microphone, according to an embodiment of the present disclosure.

FIG. 2 illustrates a block diagram of a microphone 108a, according to an embodiment of the present disclosure. The microphone 108a is an example of the sound sensor 108, shown in FIG. 1. Referring to FIGS. 1 and 2, the microphone 108a detects sounds generated by the latch 118, the hinge 116, and/or other portions of the door 102 as the door 102 is moved between the closed and open positions. In at least one other embodiment, the microphone 108a is configured to detect sounds, whether or not caused by the latch 118, the hinge 116, and/or other portions of the door 102.

Figure 3:
FIG. 3 illustrate a block diagram of an accelerometer, according to an embodiment of the present disclosure.

FIG. 3 illustrate a block diagram of an accelerometer 108b, according to an embodiment of the present disclosure. The accelerometer 108b is an example of the sound sensor 108, shown in FIG. 1. Referring to FIGS. 1 and 2, the accelerometer 108b detects vibrations caused by sounds generated by the latch, the hinge 116, and/or other portions of the door 102 as the door 102 is moved between closed and open positions. In at least one other embodiment, the accelerometer 108b is configured to detect vibrations caused by sounds, whether or not caused by the latch 118, the hinge 116, and/or other portions of the door 102.

Referring again to FIG. 1, the sound sensor 108 is configured to detect sound energy, whether in the form of sounds detected by the microphone 108a (shown in FIG. 2), or vibrations detected by the accelerometer 108b (shown in FIG. 3). The monitoring control unit 110 receives a sound signal 120 that is output by the sound sensor 108. The sound signal 120 is indicative of the sound energy detected by the sound sensor 108. The monitoring control unit 110 analyzes the sound signal 120 to determine a status of the door 102. For example, the monitoring control unit 110 analyzes the sound signal 120 to determine if the door 102 is open or closed. In this manner, the monitoring control unit 110 is configured to determine the status of the door 102 by analyzing sound energy caused by motion of the door 102, such as between a closed position and an open position.

In at least one embodiment, the monitoring control unit 110 is programmed to recognize the sound energy caused by the latches 118 engaging or disengaging a portion of the door 102, the hinge 116 pivoting open and closed, and/or other portions of the door 102 as the door moves between the closed and open positions. For example, the monitoring control unit 110 is configured to recognize the frequencies of such portions of the component 104 as the door 102 moves between the closed and open positions.

In at least one embodiment, the sound sensor 108 in the form of the microphone 108a (shown in FIG. 2) detects the sound energy in the form of sounds generated by the door 102 moving between a closed position and an open position. The monitoring control unit 110 receives the sound signals 120, as detected and output by the sound sensor 108. The monitoring control unit 110 is programmed to detect one or more frequencies of the door 102 moving from the closed position to the open position. As such, the monitoring control unit 110 is able to determine that the door 102 is open through analysis of the sound signal 120. Similarly, as the door 102 is closed, the monitoring control unit 110 analyzes the sound signal 120 to determine that the door 102 is closed.

In at least one other embodiment, the sound sensor 108 in the form of the accelerometer 108b (shown in FIG. 3) detects the sound energy in the form of vibrations caused by sounds generated by the door 102 moving between the closed position and the open position. The monitoring control unit receives the sound signals 120, as detected and output by the sound sensor 108. The monitoring control unit 110 is programmed to distinguish the vibrations and correlates such vibrations with an opening and closing of the door 102. Therefore, the monitoring control unit 110 is able to determine that the door 102 is open through analysis of the sound signal 120. Similarly, as the door 102 is closed, the monitoring control unit 110 analyses the sound signal 120 to determine that the door 102 is closed.

In at least one embodiment, the monitoring control unit 110 is programmed to analyze portions of the sound signal that relate to the opening of the door 102 (such as frequencies and/or vibrations caused by sounds generated by the hinge 116, the latch 118, and/or other portions of the door 102), and ignore other sound energy. For example, a sound filter 122 may be coupled to the monitoring control unit 110. In at least one embodiment, the sound filter 122 is disposed between the sound sensor 108 and the monitoring control unit 110. In at least one other embodiment, the sound sensor 108 includes the sound filter 122. The sound filter 122 is configured to filter only sound energy caused by the hinge 116, the latch 118, or other portions of the door 102. The sound filter 122 removes sounds that are unrelated to sounds generated by the door 102 as it moves. The unrelated sounds are removed from the sound signal 120. In at least one other embodiment, the monitoring system 100 may not include the sound filter 122.

In at least one other embodiment, instead of being trained to focus on sound energy caused by opening and closing of the door 102, the monitoring control unit 110 is configured to determine the status of the door 102 by comparing the sound signal 120 in relation to a sound threshold. For example, in at least one embodiment, the sound sensor 108 is disposed within the internal chamber 112. When the door 102 is closed, the sound sensor 108 detects muffled or attenuated ambient sound energy (that is, sound energy outside of the component 104), as the door 102 is closed, and therefore reduces sound energy that enters the internal chamber 112. Conversely, as the door 102 is opened, an increased amount of ambient sound energy enters the internal chamber 112, as the door 102 no longer blocks, muffles, or otherwise attenuates the sound energy. As such, the monitoring control unit 110 may compare the sound energy detected by the sound sensor 108 and output as the sound signal 120 in relation to a sound threshold. If the sound signal 120 is less than the sound threshold, the monitoring control unit 110 determines that the door 102 is closed. If, however, the sound signal equals or exceeds the sound threshold, the monitoring control unit 110 determines that the door 102 is open.

The monitoring control unit 110 outputs a door status signal 130, such as via one or more wired or wireless connections, that is received by a computing device, such as a flight computer device within a cockpit, an electronic workstation, or a handheld device (such as a smart phone or smart tablet). The door status signal 130 indicates a status of the door, whether open or closed. As such, an individual may be automatically informed of the status of the door 102 without the need for manual inspection of the door 102 or having to communicate with another ground crew individual. Therefore, a flight crew, for example, may quickly and readily determine a status of the door 102, which may then allow for a quicker turnaround time of an aircraft at a gate.

In at least one embodiment, the monitoring control unit 110 executes a machine learning classifier to determine whether the door 102 is open or closed. That is, the monitoring control unit 110 may automatically discern the sound energy of the door 102 opening and closing through analysis of received sound signals over time. Optionally, the monitoring control unit 110 may be pre-programmed to recognize the sound energy of the door 102 opening and closing, such as through stored frequency or vibration data.

As described, the monitoring system 100 is configured to detect a status of the door 102 of the component 104 of the vehicle 106. The sound sensor 108 is within the auditory range 114 of the door 102. The sound sensor 108 detects sound energy in relation to an open position of the door 102 and a closed position of the door 102. For example, the sound sensor 108 detects sound energy generated by the door 102 as the door moves between a closed position and an open position (that is, moving from the closed position to the open position, or vice versa). The sound sensor 108 outputs the sound signal 120 indicative of the sound energy. The monitoring control unit 110 is in communication with the sound sensor 108. The monitoring control unit 110 receives the sound signal 120 and analyzes the sound signal 120 to determine the status of the door 102.

As used herein, the term "control unit," "unit," "central processing unit," "CPU," "computer," or the like may include any processor-based or microprocessor-based system including systems using microcontrollers, reduced instruction set computers (RISC), application-specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the monitoring control unit 110 may be or include one or more processors that are configured to control operation thereof.

The monitoring control unit 110 is configured to execute a set of instructions that are stored in one or more storage elements (such as one or more memories), in order to process data. For example, the monitoring control unit 110 may include or be coupled to one or more memories. The storage elements may also store data or other information as desired or needed. The storage elements may be in the form of an information source or a physical memory element within a processing machine.

The set of instructions may include various commands that instruct the monitoring control unit 110 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the monitoring control unit 110. It is to be understood that the processing or control units may represent electronic circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the monitoring control unit 110 may represent processing circuitry such as one or more of a field-programmable gate array (FPGA), application-specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
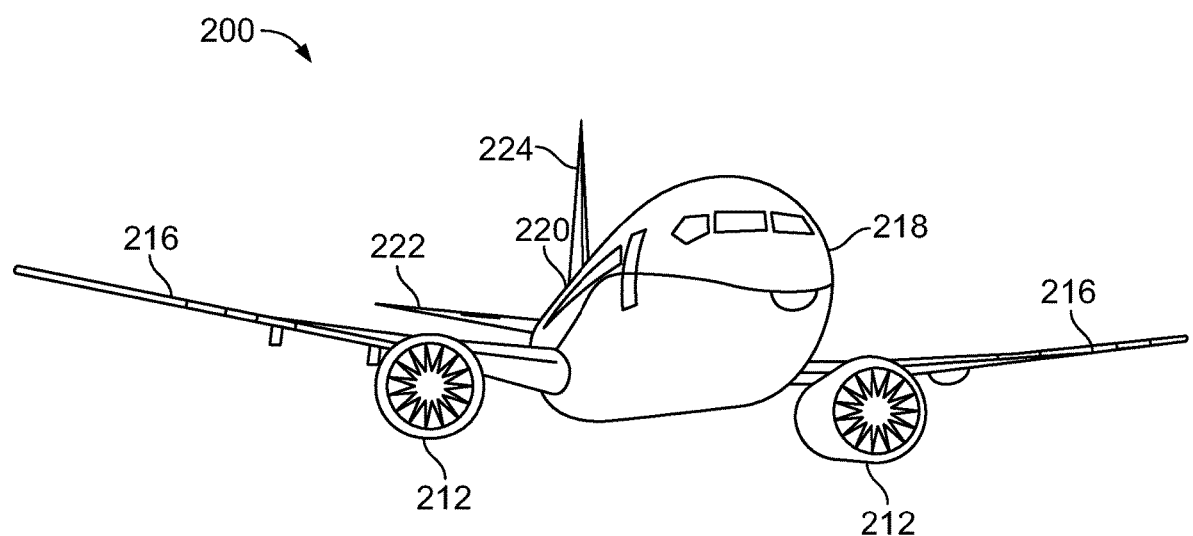
FIG. 4 illustrates a perspective front view of an aircraft, according to an embodiment of the present disclosure.

FIG. 4 illustrates a perspective front view of an aircraft 200, according to an embodiment of the present disclosure. The aircraft 200 is an example of the vehicle 106 shown in FIG. 1. The aircraft 200 may include a propulsion system that may include two engines 212, for example. Optionally, the propulsion system may include more engines 212 than shown. The engines 212 are carried by wings 216 of the aircraft 200. In other embodiments, the engines 212 may be carried by a fuselage 218 and/or an empennage 220. The empennage 220 may also support horizontal stabilizers 222 and a vertical stabilizer 224. The wings 216, the horizontal stabilizers 222, and the vertical stabilizer 224 may each include one or more control surfaces.

Optionally, embodiments of the present disclosure may be used with respect to various other structures, such as other vehicles (including automobiles, watercraft, spacecraft, and the like), buildings, appliances, and the like. For example, the monitoring system 100 shown in FIG. 1 may be used with vehicles 106 other than aircraft. As another example, the monitoring system 100 shown in FIG. 1 may be used with fixed structures, instead of vehicles.

Figure 5:
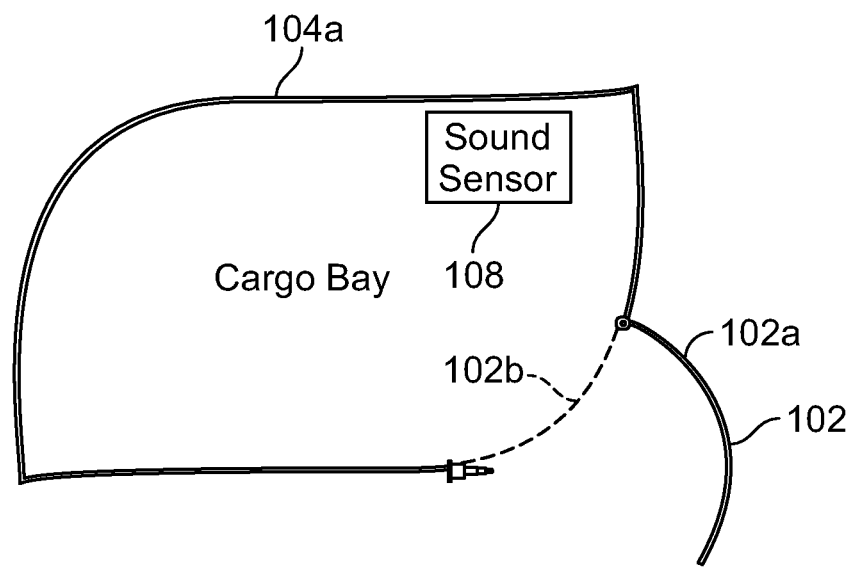
FIG. 5 illustrates a simplified schematic diagram of a cargo bay, according to an embodiment of the present disclosure.

FIG. 5 illustrates a simplified schematic diagram of a cargo bay 104a, according to an embodiment of the present disclosure. The cargo bay 104a is an example of the component 104 shown in FIG. 1. In at least one embodiment, the aircraft 200 shown in FIG. 4 includes the cargo bay 104a.

As shown, the sound sensor 108 may be disposed within the cargo bay 104a. The sound sensor 108 is configured to detect sound energy caused by the door 102 of the cargo bay 104a moving between an open position 102a and a closed position 102b. Referring to FIGS. 1 and 5, the monitoring control unit 110 receives the sound signal 120 from the sound sensor 108, and analyzes the sound signal 120 to determine whether the door 102 is open or closed, as described above.

Figure 6:
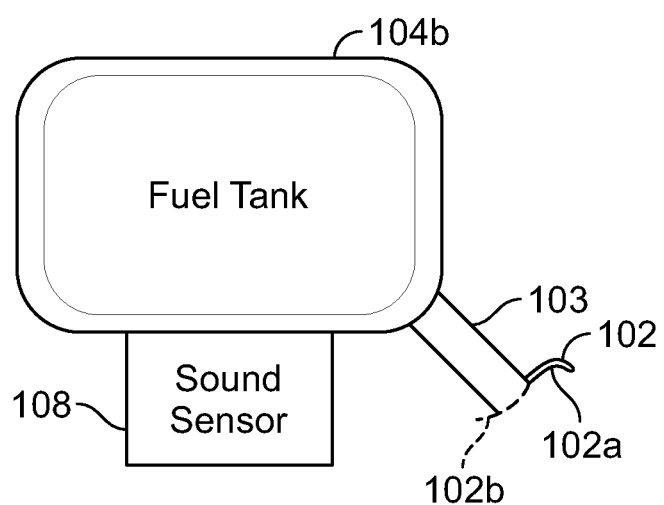
FIG. 6 illustrates a simplified schematic diagram of a fuel tank, according to an embodiment of the present disclosure.

FIG. 6 illustrates a simplified schematic diagram of a fuel tank 104b, according to an embodiment of the present disclosure. The fuel tank 104b is an example of the component 104 shown in FIG. 1. In at least one embodiment, the aircraft 200 shown in FIG. 4 includes the fuel tank 104b.

A door 102 is moveably secured to a fuel inlet line 103 that fluidly connects to the fuel tank 104b. The sound sensor 108 is mounted to the fuel tank 104b, or otherwise at a position within an auditory range of the door 102. The sound sensor 108 is configured to detect sound energy caused by the door 102 of the fuel tank 104b moving between an open position 102a and a closed position. 102b In at least one embodiment, the sound sensor 108 may also be configured to detect sound energy caused by a refueling operation, such as the sounds generated by a fuel nozzle being inserted into the fuel inlet line 103, fuel being dispensed into the fuel inlet line 103, and/or the like. Referring to FIGS. 1 and 6, the monitoring control unit 110 receives the sound signal 120 from the sound sensor 108, and analyzes the sound signal 120 to determine whether the door 102 is open or closed, as described above.

Figure 7:
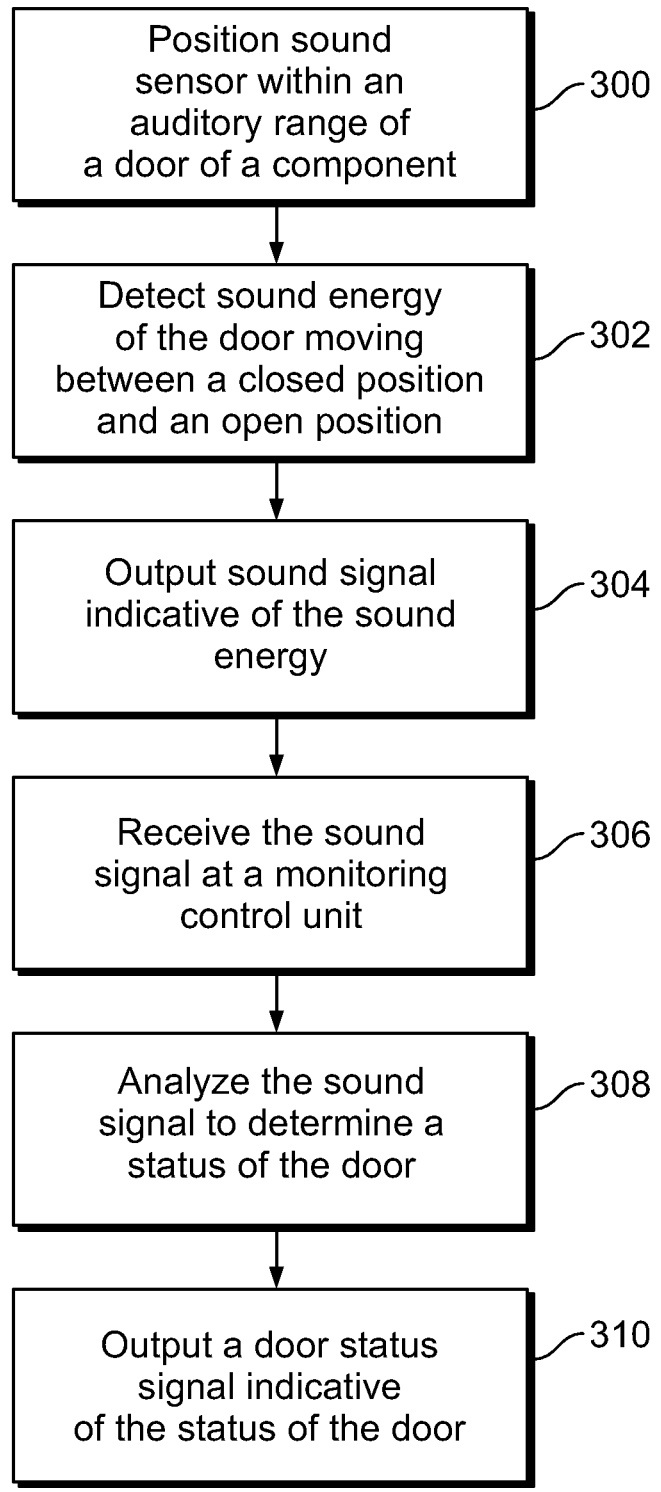
FIG. 7 illustrates a flow chart of a monitoring method for a door of a component of a vehicle, according to an embodiment of the present disclosure.

FIG. 7 illustrates a flow chart of a monitoring method for a door of a component of a vehicle, according to an embodiment of the present disclosure. Referring to FIGS. 1 and 7, at 300, the sound sensor 108 is positioned within an auditory range of the door 102 of the component 104. For example, the sound sensor 108 may be disposed within the internal chamber 112 of the component 104. As another example, the sound sensor 108 may be mounted to an outer surface of the component 104. As another example, the sound sensor 108 may be mounted to a surface of the door 102.

At 302, the sound sensor 108 detects sound energy of the door 102 moved between a closed position and an open position (such as from the closed position to the open position, or vice versa). For example, the sound sensor 108 detects sound energy (for example, sound, vibration or other such auditory signals) generated by latches, hinges, or other portions of the door 102 as the door 102 moves between the closed position and the open position. At 304, the sound sensor 108 outputs the sound signal 120, which is indicative of the detected sound energy.

At 306, the monitoring control unit 110 receives the sound signal 120. At 308, the monitoring control unit 110 analyzes the sound signal 120 to determine a status of the door. For example, the monitoring control unit 110 analyzes the sound signal 120 to determine whether the door 102 is closed or open. At 310, the monitoring control unit 110 outputs the door status signal 130 indicative of the status of the door 310. The door status signal 130 is received by a computing device, such as a handheld device, a computer workstation, or the like that is monitored by an individual, such as flight crew, ground crew, or the like.

As described herein, embodiments of the present disclosure provide systems and methods that reduce turnaround time of an aircraft at a gate of an airport. Further, embodiments of the present disclosure provide systems and methods that quickly and efficiently monitor status of doors of various components of an aircraft, such as cargo doors, fuel doors, and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A monitoring system configured to detect a status of a door for each of a cargo bay and a fuel tank of a vehicle, the monitoring system comprising:
   a first sound sensor positioned within an auditory range of the door of the cargo bay;
   a second sound sensor positioned with an auditory range of the door of the fuel tank, wherein the first sound sensor and the second sound sensor are configured to detect sound energy of an open position of the door of each of the cargo bay and the fuel tank, respectively, and a closed position of the door of each of the cargo bay and the fuel tank, respectively, and wherein the first sound sensor and the second sound sensor are further configured to output a sound signal indicative of the sound energy; and
   a monitoring control unit in communication with the first sound sensor and the second sound sensor, wherein the monitoring control unit is configured to receive the sound signal and analyze the sound signal to determine the status of the door, and wherein the monitoring control unit is further configured to execute a machine learning classifier, based on the sound signal, to determine whether the door is in the open position or the closed position.

2. The monitoring system of claim 1, wherein the first sound sensor is within an internal chamber of the cargo bay.

3. The monitoring system of claim 1, wherein the first sound sensor is mounted on the cargo bay.

4. The monitoring system of claim 1, wherein one or both of the first sound sensor or the second sound sensor is a microphone.

5. The monitoring system of claim 1, wherein one or both of the first sound sensor or the second sound sensor is an accelerometer.

6. The monitoring system of claim 1, wherein one or both of the first sound sensor or the second sound sensor is configured to detect the sound energy generated by the door as the door moves between a closed position and an open position.

7. The monitoring system of claim 6, wherein the monitoring control unit is further configured to recognize the sound energy caused by one or more latches, one or more hinges, or other portions of the door as the door moves between the closed position and the open position.

8. The monitoring system of claim 6, further comprising a sound filter configured to filter, from the sound signal, sound that is unrelated to the sound energy generated by the door.

9. The monitoring system of claim 1, wherein the monitoring control unit is configured to compare the sound signal in relation to a sound threshold to determine if the door is the open position or the closed position.

10. The monitoring system of claim 9, wherein the monitoring system is further configured to:
    determine that the door is in the closed position in response to the sound signal being less than the sound threshold; and
    determine that the door is in the open position in response to the sound signal being equal to or exceeding the sound threshold.

11. The monitoring system of claim 1, wherein the door of the fuel tank is moveably secured to a fuel inlet line that fluidly connects to the fuel tank, and wherein the second sound sensor is mounted to the fuel tank.

12. A monitoring method for detecting a status of a door for each of a cargo bay and a fuel tank of a vehicle, the monitoring method comprising:
    positioning a first sound sensor within an auditory range of the door of the cargo bay;
    positioning a second sound sensor within an auditory range of the door of the fuel tank;
    detecting, by the first sound sensor and the second sound sensor, sound energy of an open position of the door of each of the cargo bay and fuel tank, respectively, and a closed position of the door of each of the cargo bay and fuel tank, respectively;
    outputting, by each of the first sound sensor and the second sound sensor, a sound signal indicative of the sound energy;
    receiving, by a monitoring control unit in communication with each of the first sound sensor and the second sound sensor, the sound signal; and
    analyzing, by the monitoring control unit, the sound signal to determine the status of the door, wherein said analyzing comprises determining determine whether the door is in the open position or the closed position by executing a machine learning classifier, based on the sound signal.

13. The monitoring method of claim 12, wherein said positioning the first sound sensor comprises positioning the first sound sensor within an internal chamber of the cargo bay.

14. The monitoring method of claim 12, wherein said positioning the first sound sensor comprises positioning the first sound sensor on the cargo bay.

15. The monitoring method of claim 12, wherein said detecting comprises detecting the sound energy generated by the door as the door moves between a closed position and an open position.

16. The monitoring method of claim 15, wherein said analyzing comprises recognizing the sound energy caused by one or more latches, one or more hinges, or other portions of the door as the door moves between the closed position and the open position.

17. The monitoring method of claim 15, further comprising filtering, from the sound signal and by a sound filter, sound that is unrelated to the sound energy generated by the door.

18. The monitoring method of claim 12, wherein said analyzing comprises comparing the sound signal in relation to a sound threshold to determine if the door is the open position or the closed position.

19. A vehicle comprising:
   a cargo bay;
   a fuel tank, wherein each of the cargo bay and the fuel tank has a door configured to move between a closed position and an open position; and
   a monitoring system configured to detect a status of the door, wherein the monitoring system comprises:
      a first sound sensor positioned within an auditory range of the door of the cargo bay, and a second sound sensor positioned within an auditory range of the door of the fuel tank, wherein the first sound sensor and the second sensor are configured to detect sound energy of the closed position and the open position of the door, and wherein the first sound sensor and the second sound sensor are further configured to output a sound signal indicative of the sound energy;
      a sound filter configured to filter, from the sound signal, sound that is unrelated to the sound energy generated by the door; and
      a monitoring control unit in communication with the first sound sensor and the second sound sensor, wherein the monitoring control unit is configured to receive the sound signal and analyzes the sound signal to determine the status of the door, wherein the monitoring control unit is further configured to recognize the sound energy caused by one or more latches, one or more hinges, or other portions of the door as the door moves between the closed position and the open position, and wherein the monitoring control unit is further configured to execute a machine learning classifier, based on the sound signal, to determine whether the door is in the open position or the closed position.

20. The monitoring method of claim 18, further comprising:
   determining that the door is in the closed position in response to the sound signal being less than the sound threshold; and
   determining that the door is in the open position in response to the sound signal being equal to or exceeding the sound threshold.

* * * * *